United States Patent [19]

Mikos

[11] Patent Number: 5,031,131
[45] Date of Patent: Jul. 9, 1991

[54] DIRECT DIGITAL SYNTHESIZER
[75] Inventor: Jerome J. Mikos, Sylmar, Calif.
[73] Assignee: Eaton Corporation, Cleveland, Ohio
[21] Appl. No.: 593,373
[22] Filed: Oct. 1, 1990

Related U.S. Application Data

[63] Continuation of Ser. No. 270,853, Nov. 14, 1988, abandoned.

[51] Int. Cl.$^5$ .............................................. G06F 1/02
[52] U.S. Cl. .................................................. 364/721
[58] Field of Search .......................... 364/721; 328/14

[56] References Cited

U.S. PATENT DOCUMENTS

| | | | |
|---|---|---|---|
| 3,735,269 | 5/1973 | Jackson | 328/14 |
| 3,772,681 | 11/1973 | Skingle | 328/14 X |
| 3,973,209 | 8/1976 | Nossen et al. | 328/14 |
| 4,134,072 | 1/1979 | Bolger | 328/14 |
| 4,328,554 | 5/1982 | Mantione | 364/721 |
| 4,635,279 | 1/1987 | Nossen | 364/721 X |
| 4,652,832 | 3/1987 | Jasper | 328/14 |
| 4,669,024 | 5/1987 | Stacey | 364/721 X |
| 4,752,902 | 6/1988 | Goldberg | 364/721 |
| 4,809,205 | 2/1989 | Freeman | 364/721 |

Primary Examiner—Dale M. Shaw
Assistant Examiner—Tan V. Mai
Attorney, Agent, or Firm—C. H. Grace

[57] ABSTRACT

An improved digital data synthesizer has a phase accumulator into which adjustable step increments are clocked. The output of the phase accumulator is connected to address a memory, in which a waveform function is digitally stored. Samples read from the memory at the successive addresses are converted to analog form and filtered to produce a final output signal of a desired frequency. Register stages of the phase accumulator are pipelined to increase their speed. The synthesizer has a plurality of digital-to-analog converters, all on a single chip to equalize the delay times occurring within them. A lookup memory permits a variety of output waveforms to be generated. Several lookup tables for the same waveform are stored with different phase spacing between addresses, and a decoder/addresser automatically selects the lookup table that has been found to result in best performance for a particular frequency. One or more correction lookup table can also be provided. The outputs of the main table and the correction table are combined to produce an analog signal of reduced distortion.

11 Claims, 4 Drawing Sheets

DIRECT DIGITAL SYNTHESIZER

This application is a continuation of application Ser. No. 07/270,853, filed Nov. 14, 1988, now abandoned.

BACKGROUND OF THE INVENTION

The invention relates to Digital Data Synthesizers (DDSs) of types that receive digital information representing a desired frequency and produce at the output a cyclical signal having the specified frequency and a preset waveform The desired waveform is stored digitally in advance at successive addresses in a memory. To generate an output signal, a clock establishes sampling times, at each of which a "phase accumulator" generates a greater address. From each address a digital sample value of the desired output waveform is read. The size of address steps at which sample values of the stored waveform are read is changeable, to produce the desired frequency.

For example, many values of a sine function table can be stored in a memory at successive addresses, corresponding to successive phase angles. The storage memory is accessed at a clock-determined sampling rate, with a "staircase-shaped" addressing function. The values of a sine wave are read from the memory, in digital form, at 5-degree steps along the sine function table. The successive sample values that are read out are converted to analog voltages by digital-to-analog converters, (DACs) and the resulting waveform is smoothed by filtering to produce a relatively clean sine wave.

To produce an output at twice the previous frequency, the sample values are taken with the same clock-determined sampling rate as above, but at 10-degree steps along the stored waveform.

A prior art DDS of this type is disclosed in Goldberg's U.S. Pat. No. 4,752,902, issued June 21, 1988, which is incorporated herein by reference. A similar synthesizer is described in Jackson's U.S. Pat. No. 3,735,269, issued May 22, 1973, which is also incorporated herein by reference. The subject is treated generally in an article entitled "A Digital Frequency Synthesizer" published in IEEE Transactions On Audio and Electroacoustics, Volume AU-19, No. 1, March 1971, pages 48–56, and authored by Tierney, et al.

SUMMARY OF THE INVENTION

The invention is an improvement in digital data synthesizers.

An object is to provide a synthesizer having register stages that are pipelined to increase the speed, enabling a relatively high maximum output frequency.

Another object is to provide a synthesizer having a plurality of DACs, all fabricated on the same chip to equalize the delay times occurring within them, for improving the resolution of the analog output signal.

Another object is to utilize a Random Access Memory (RAM) for storing a lookup table to enable the synthesizer to generate different shapes of waveforms, so that the waveforms can easily be changed.

Another object is to provide a DDS having a plurality of lookup tables for the same waveform, stored with different phase spacing between addresses, and having a decoder addresser for automatically selecting for use the lookup table that results in the best performance for the particular output frequency that is specified at the input.

Another object is to provide a DDS having, in addition to the usual main lookup table and its associated main DAC, an ancillary lookup table containing predetermined correction data and an ancillary DAC. The outputs of the main channel and the correction channel are combined to produce an analog signal having reduced distortion. A plurality of correction channels, automatically addressable, can be provided.

Another object is to provide both a plurality of main lookup tables and a plurality of correction channels, each plurality being automatically addressable.

DESCRIPTION OF PREFERRED EMBODIMENT

Figure 1:
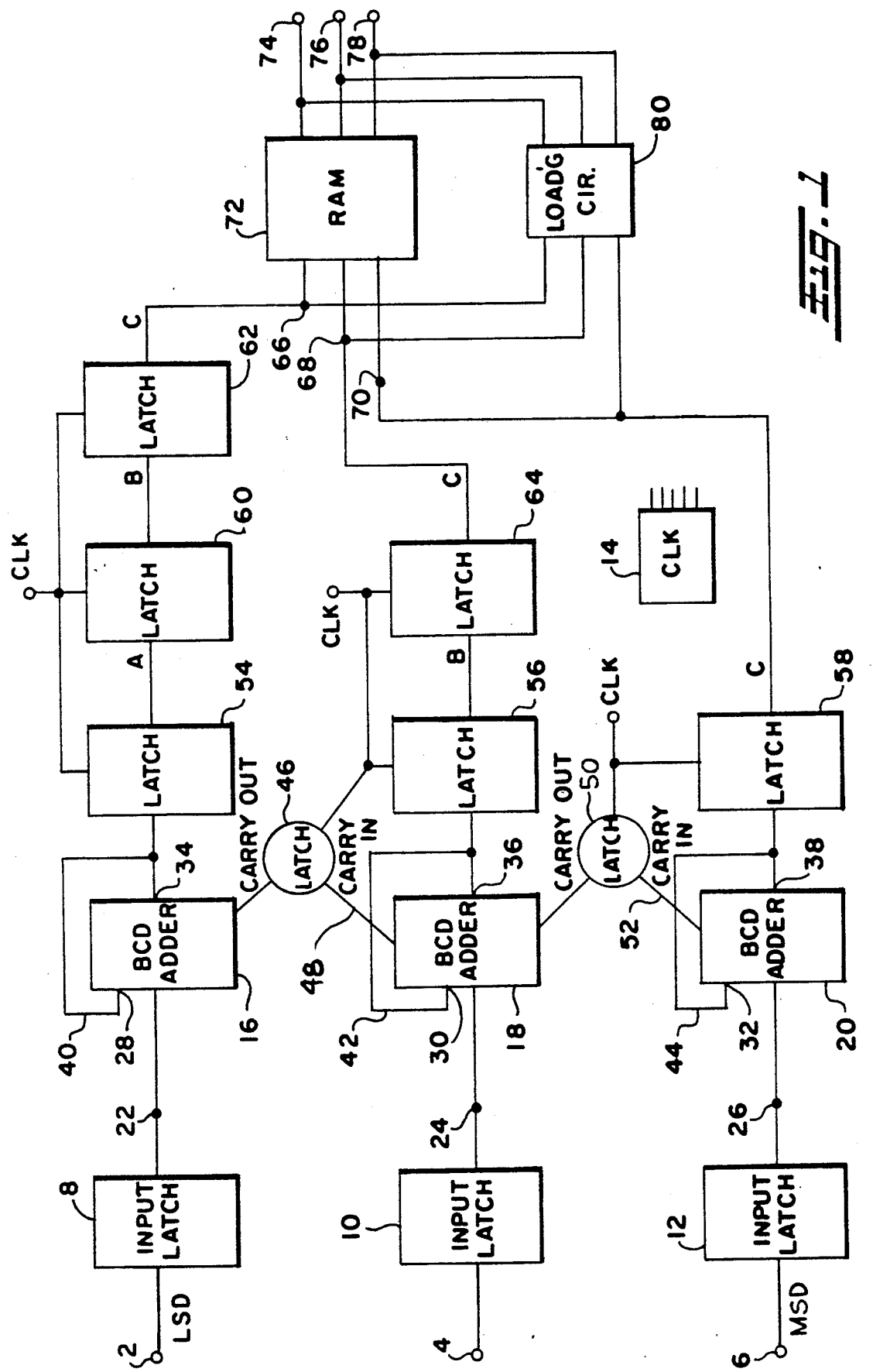
FIG. 1 is a block diagram of the input portion of a preferred embodiment of the invention.

As shown in FIG. 1 by way of example of an embodiment of the invention, terminal groups 2, 4, and 6 receive Binary Coded Decimal (BCD) input data that collectively specify the desired output frequency of the DDS. The Least Significant (decimal) Digit (LSD) is entered at terminal group 2 and the Most Significant Digit (MSD) at terminal 6. The data are stored in input latches 8, 10, and 12 respectively, and represent the size of step that is to be taken upon each clock cycle as the memory is successively addressed.

A clock 14 controls the timing of events in the DDS as a whole.

For each decimal digit, a BCD adder is provided, namely adders 16, 18, and 20 respectively. The adders are arranged with feedback to serve as accumulators. The entries that are to be accumulated are the data from outputs of the latches 8, 10, and 12; the data are entered at terminals 22, 24, and 26 of the BCD adders. Each adder has second input data terminals 28, 30, 32, and output terminals 34, 36, 38.

Feedback lines 40, 42, 44 conduct output data signals from terminals 34, 36, 38 to the second data input terminals 28, 30, 32. The data contents of the adders 34, 36, 38 are subsequently employed as addresses, and each such address represents a phase angle of a stored waveform, as will be described in more detail below.

Spillover or carry-out data from the LSD adder stage 16 is conveyed to a "carry latch" 46, which is controlled by the clock 14. Output data from carry latch 46 is input on a line 48 as a "carry in" to the adder 18, in which it is added to the other input data of adder 18. In a similar manner, a carry latch 50 receives carry-out data from the adder 18, and communicates it via a line 52 to an input of the MSD adder 20.

From the output terminals 34, 36, 38 of the adders 16, 18, and 20, data are conveyed to inputs of latches 54, 56, 58 respectively, as shown in FIG. 1. Latch 54 provides its output data to a pipeline latch 60, whose output in turn is connected to another pipeline latch 62, whose output terminals are denoted 66. The latch 56 supplies data from its output terminals to the inputs of a latch 64, whose output terminals are 68. Output data from the latch 58, at terminal 70, do not pass through any further latches.

Thus the data from the LSD adder 16 arrive three clock cycles later at the output 66 of a pipeline comprising latches 54, 60, and 62. The carry-out data from adder 16 has one clock cycle of delay in the latch 46 and adder 18, plus two cycles of delay in the latches 56 and 64, so it also arrives at the output 68 of its pipeline three clock cycles later. As for the MSD, the carry-out data from adder 16 also has one clock cycle of delay in latch 46 and adder 18, a second cycle of delay in latch 50 and adder 20, and one cycle of delay in latch 58. The length of the MSD pipeline is thus three clock cycles—the same as that of the other two pipelines.

Data at the outputs of the latches 62, 64, and 58 are therefore time-synchronous. Because of the effects of the parallel pipelines of latches, a new complete set of address data is simultaneously output (at the terminals 66, 68, and 70) upon each clock cycle. The phase accumulator (comprising input latches, adders, and pipelines) receives input data in BCD format, and its various stages contain BCD addresses. (The final stage permits binary roll-out at the top frequency.)

A RAM 72 receives the set of data at the terminals 66, 68, and 70, each set of which represents a different complete BCD address within the RAM. The RAM is accessed by these addresses, and the data contents located at each RAM address is output at terminals 74, 76, and 78. The LSD is in terminal group 74; the MSD is in terminal group 78. Collectively, the data at terminals 74, 76, and 78 express one value of a stored waveform, for example a sine wave, at a phase angle represented by the corresponding addresses of the RAM 72.

A conventional loading circuit for entering a selected waveform into the RAM is shown as block 80. The waveform desired at the output during operation is preset into the RAM 72 during setup, by means of the data loading circuit 80.

Figure 2:
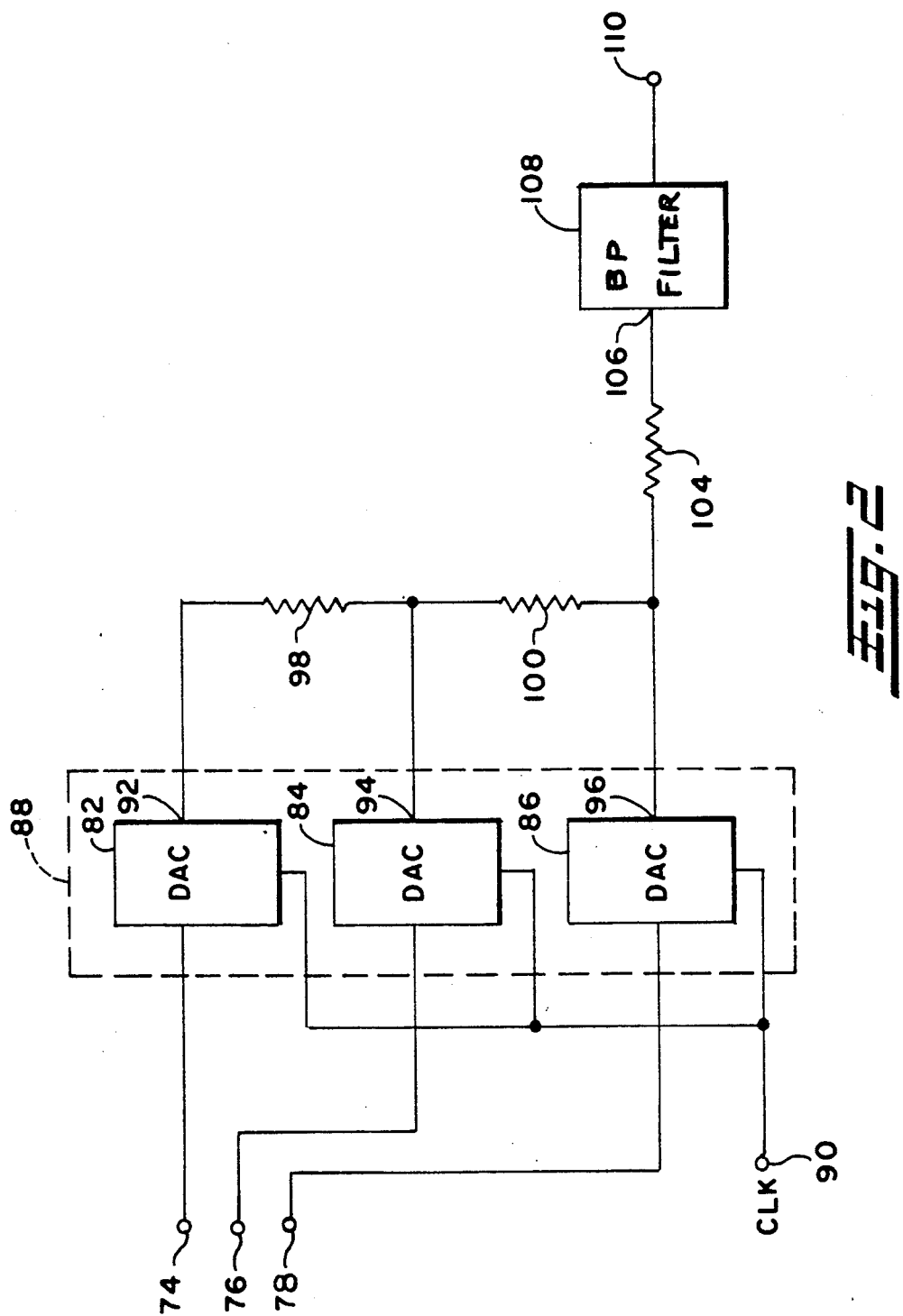
FIG. 2 is a block diagram of the output portion of the preferred embodiment.

FIG. 2 is a continuation to the right side of the drawing of FIG. 1. The terminals 74, 76, and 78 are shown on FIG. 2. New data appear there at each clock cycle. A sequence of digital samples there describes one complete cycle of the stored waveform during a time interval equal to a complete period (at the selected output frequency). The digital data of terminals 74 are applied to the inputs of a DAC 82. The more significant data of terminals 74 are applied to a DAC 84, and the most significant data, at terminals 78, are applied to a DAC 86.

All three of the independently operable DACs 82, 84, 86 are constructed on the same die of semiconductor substrate. They were fabricated at the same time, of the same materials, and by the same processes, and are therefore a closely matched set of circuits. The time delays of the three DACs in performing their conversion functions are consequently much more nearly equal than would be the time delays of DACs on separate chips. Use of such a triple DAC improves the direct digital synthesizer's resolution. Improvement in resolution, in turn, reduces output noise and transients known as "spurs", and permits the apparatus to be operated at a higher speed.

The synthesizer whose DACs are on single chip has a fidelity that is equivalent to that of a synthesizer of much more closely spaced sampling points. Triple DACs of this type are manufactured by Brooktree Corporation, 9950 Barnes Canyon Rd, San Diego, Calif., 92121. Suitable types for this usage are Brooktree models Bt 109 and Bt 453.

The conversions from digital to analog data in the DACs are initiated by pulses conducted from the clock 14 to a clock bus terminal 90. Output analog data appear at terminals 92, 94, and 96 of the DACs 82, 84, and 86 respectively.

The MSD signals at terminal 96 are connected directly to a summing resistor 104. The intermediate-significance signals, of terminal 94, are attenuated by a resistor 100 that is also connected to resistor 104; the LSD signals at terminal 92 are attenuated by a resistor 98 that is connected from terminal 92 to terminal 94. By proper choice of resistor values the outputs of the three DACs are properly weighted in accordance with their significance at the resistor 104.

Resistor 104 leads to an input terminal 106 of an electric wave filter 108, which is preferably a bandpass type. Filter 108 is capable of passing the desired output signal waveforms with little attenuation and severely attenuating the undesired higher and lower frequencies that are present in the digital-to-analog approximation. A final output terminal 110 has the sought-for output signal in a relatively clean form. The output frequency can be changed by changing the step size of the phase steps (i.e., address steps) at the input terminals 2, 4, and 6.

The time sequence of operation of the device is as follows: A desired waveform is loaded into the RAM 72 from the loading circuit 80. The frequency of the output is selected by selecting a phase step size for entry at the input terminals 2, 4, and 6. As the clock 14 operates, it repeatedly transfers the step size data from the input latches 8, 10, and 12 into the BCD adders 16, 18, and 20, where it is accumulated (integrated) into a staircase-shaped digital function representing addresses.

Addresses from the outputs of the adders 16, 18, and 20 pass through the pipeline latch stages 54–64, and are employed to address the RAM 72, in BCD format. The addresses step along in time sequence through the stored waveform in the RAM, reading a sample of the waveform's amplitude at each address. The resulting digital amplitude data are output from the RAM 72 to inputs of the matched triple DACs 82, 84, and 86. The DACs convert the digital data to analog signals that approximate the desired smooth output waveform by a staircase-shaped function. The DAC outputs are combined, with attenuation for proper weighting, and passed through an output filter 108 to produce a smooth version of the desired waveform at the selected frequency.

Figure 3:
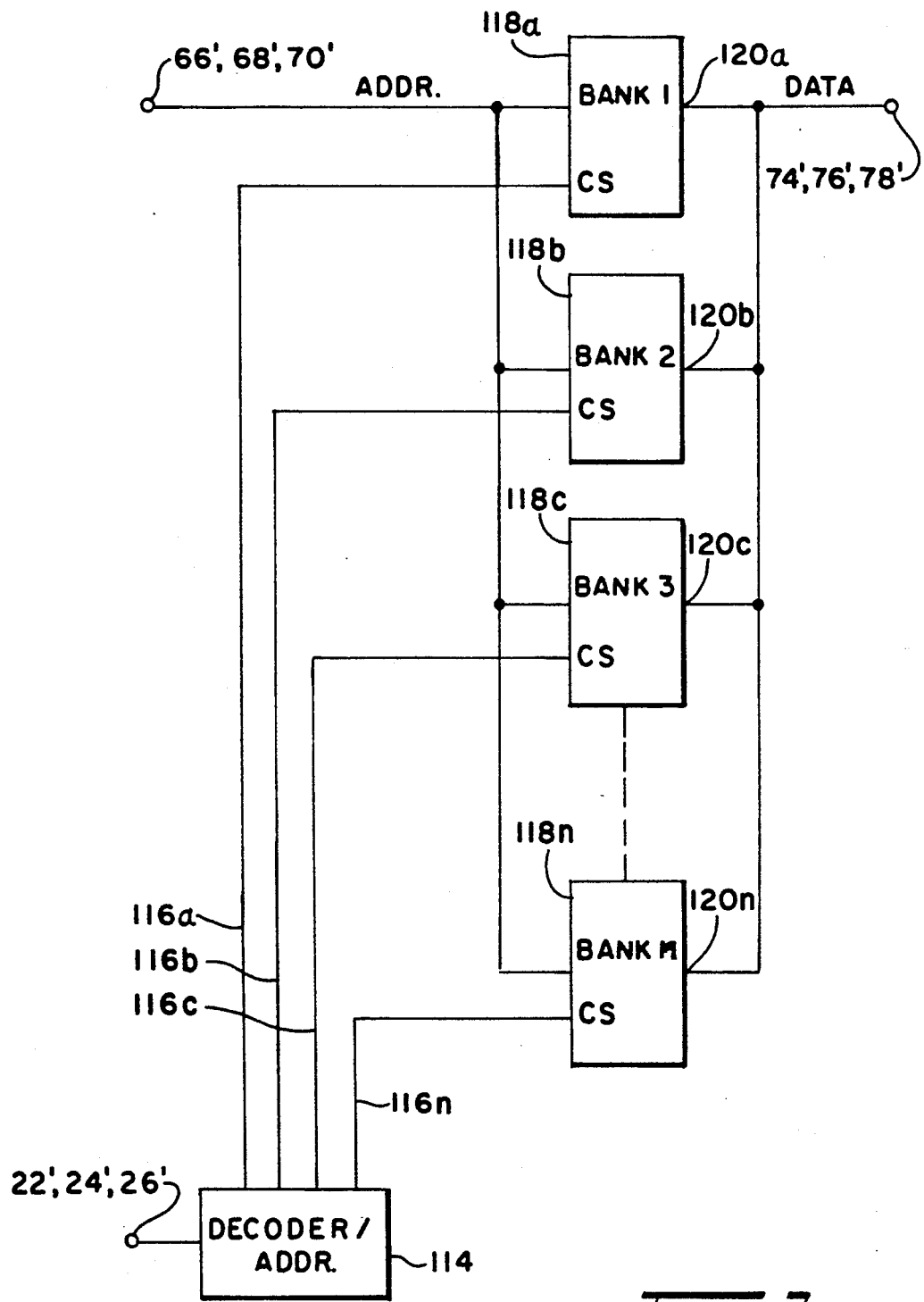
FIG. 3 shows an embodiment having a plurality of automatically addressable lookup tables.

FIG. 3 shows an embodiment of the invention in which a plurality of sine lookup tables are stored in memory, each being preferred for a synthesizing a particular frequency or category of frequencies. In order to improve the quality of (for example) the output sine wave of the DDS, several banks of sine lookup tables are used. Each bank is best for a certain frequency range. A decoder/selector automatically selects the best bank, based upon the requested frequency.

Data specifying the frequency to be synthesized are at terminals 22, 24, and 26 of FIG. 1; these terminals are shown also on FIG. 3, where they are referred to as 22', 24', 26' and are connected to inputs of a block 114. Block 114 is a decoder/addresser; it examines the specified frequency to determine which bank of sine wave data is the best one to use for synthesizing it. The decoder/addresser 114 then enables that memory bank for use.

Decoder/addresser 114, in the embodiment of FIG. 3, has several outputs, 116a, 116b, 116c, ... 116n. Each of them is connected to a chip select input (CS) of a respective memory bank, 118a, 118b, 118c, ... 118n. All of the memory banks are driven at their data input terminals by the BCD address data that is output by the pipeline latches 58, 62, 64 of the phase accumulator.

The output data terminals 120a, 120b, 120c, ... 120n of the memory banks 118a etc. are connected together at terminals 74', 76', 78', i.e., a group of BCD digit terminals. The currently-selected memory bank is the only one that produces output signals. The others are temporarily inactive. Hence the memory bank that is most appropriate for the selected frequency operates to provide data for constructing the waveform of that frequency.

Waveform data at the terminals 74', 76', 78' are connected to the DACs 82, 84, 86 of FIG. 2, (as in the earlier embodiment), which convert it to an analog signal at the input to the filter 108, (also as in the earlier embodiment). The resulting final output signal at terminal 110 is much better than that of the earlier embodiment because the sine wave table employed was tailored for accurate reproduction of the particular range or category of the frequency being synthesized.

Figure 4:
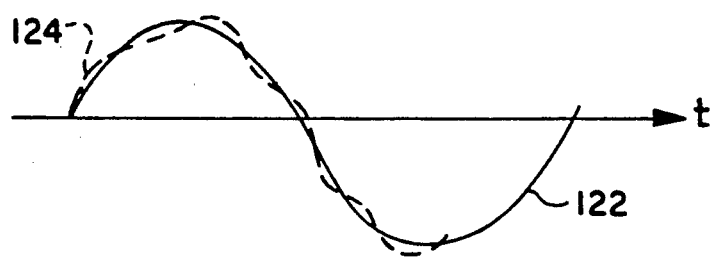
FIG. 4 illustrates an undistorted sine wave output and a distorted sine wave output, in order to describe an embodiment of FIG. 5.
Figure 5:
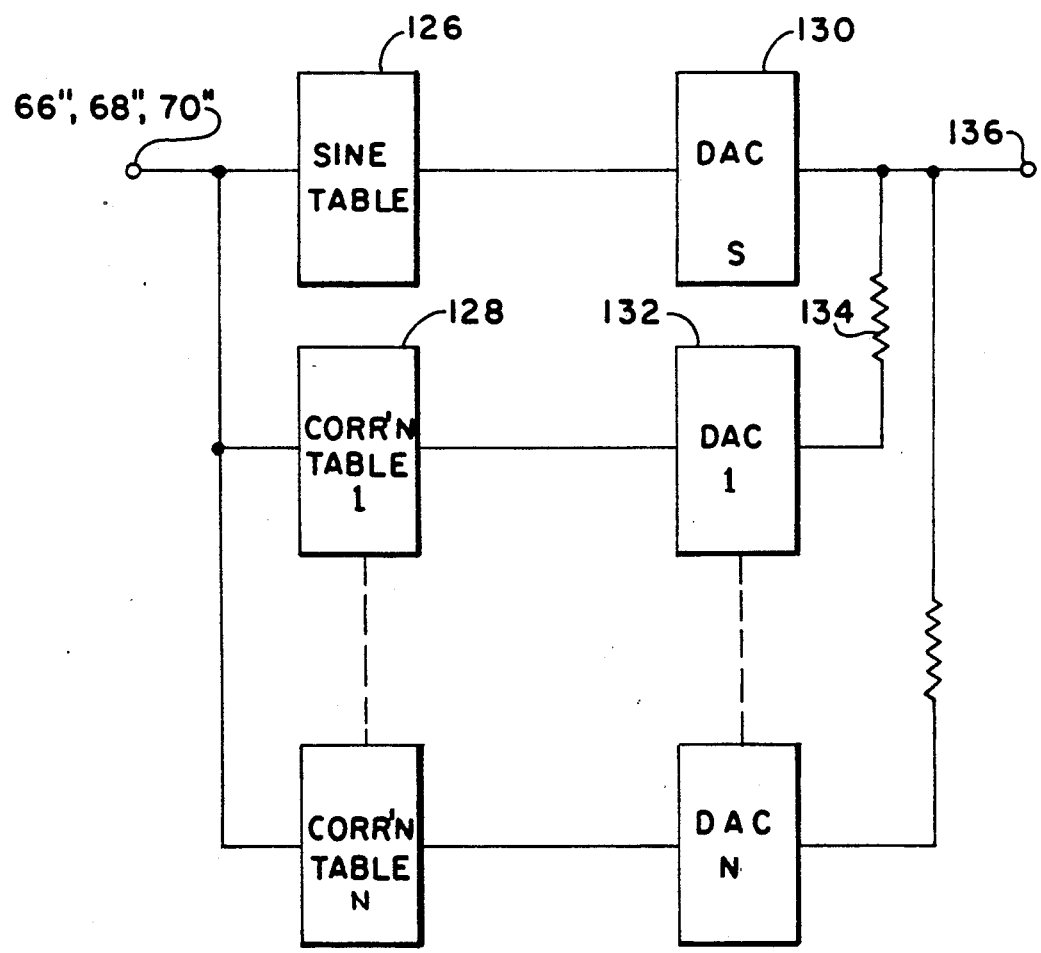
FIG. 5 is a diagram of a DDS having a main lookup channel and a correction lookup channel.

Another aspect of the invention is illustrated by FIGS. 4 and 5. FIG. 4 shows an undistorted single-frequency sine wave 122 and, on the same graph, an approximate or distorted sine wave 124 such as is sometimes produced by the embodiment of FIGS. 1 and 2, (which has only a fundamental-frequency lookup table).

The distorted sine wave 124 has two principle components, namely (a) a true single-frequency sine wave component and, superimposed upon it, an error signal component that often has the appearance of a sinusoidal function of higher frequency. The error signal component is a result of the relationship between (a) the phase spacing between contiguous addresses in the memory of the stored lookup table, which is related to the number of memory addresses within one complete cycle of the waveform to be synthesized, and (b) the phase spacing or number of memory addresses spanned by the step size that is entered into the input latches 8, 10, 12.

FIG. 5 shows the use of a main RAM having a sine function lookup table and a first DAC, cooperating with a correction RAM having a correction lookup table and a second DAC, to produce a higher fidelity output sine wave than curve 124 of FIG. 4, as will now be described in more detail.

In FIG. 5, data from the pipelines of the phase accumulator are at terminals 66", 68", and 70". The are connected to input terminals of a RAM sine lookup memory bank 126 and of a RAM correction lookup memory bank 128. These memory banks are addressed by that data, and they deliver up data that are the contents of the addresses. Output data from the sine lookup bank 126 are communicated to a fundamental sine DAC 130, and output data from the correction lookup table 128 go to a correction DAC 132.

In the case of the output from DAC 132, a resistor 134 is inserted in series, in order to attenuate its signals relative to those of DAC 130. The outputs of DACs 130 and 132 are additively combined following that attenuation, at a terminal 136. This terminal drives the output filter 108, (FIG. 2), which preferably has a different transfer characteristic in the case of this embodiment.

Operation of the embodiment of FIG. 5 is as follows: When, during setup, a sine lookup table is loaded into the main memory 126, the correction lookup table is also loaded, into the second memory bank 128. The correction lookup table RAM 128 and its auxiliary DAC 132 are a form of active filter, that interjects a corrective signal component to cancel the distortion, before the output filter 108 even receives the signal.

Values for use in the correction table can be ascertained by mathematical analysis or empirically. As an example of an empirical approach, the correction channel can be temporarily disabled, and the output of the main DAC 130 recorded, (or the output of the filter 108). The deviations of the recorded output from the desired waveform can be measured, point by point (corresponding to the addresses where data are stored in memory 126), and the deviations can be entered, with the opposite sign, in the correction lookup table 128. For routine operation the correction channel is then enabled; the combined output of DACs 130 and 132 is closer to the desired waveform than is the output of DAC 130 alone.

A compromise correction table can be used, to serve in common for a plurality of desired frequencies. Moreover, a plurality of correction lookup tables, automatically selected by an addresser/decoder of the type shown in FIG. 3, can select a lookup table appropriate for a frequency group of which the desired output frequency is a member. The selected correction table can be employed with a single main lookup table 130.

Alternatively, the embodiment of FIG. 3 can be used together with a multiple version of the embodiment of FIG. 5, so that both a plurality of main lookup tables and a plurality of correction lookup tables can be optimally correlated with output frequency ranges. Such a combination of embodiments results in even greater fidelity in the output signal than is achievable by either embodiment alone.

Although the invention has been described by a single preferred example, its concepts can be employed in a variety of embodiments. The scope of the invention is defined by the claims.

The invention claimed is:

1. A digital data synthesizer comprising:
   means for storing input data that determines a frequency to be synthesized;
   clock means for transferring said input data from said storing means to accumulator means;
   accumulator means for accumulating the stored input data and outputting addresses;
   a plurality of memory means, each of which has a plurality of addresses that cooperate to store a different digital representation of a same waveform, for outputting digital data when said memory means are accessed one at a time by a sequency of addresses from said accumulator means;
   decoder/addresser means responsive to the frequency selected to be synthesized, for selectively activating only one memory means at time, of said plurality of memory means, that is predetermined for use in synthesizing said selected frequency;
   whereby a different one of the plurality of memory means is selectable for synthesizing a waveform of one selected frequency than for synthesizing the same waveform of a different selected frequency.

2. A digital data synthesizer as in claim 1 and wherein at least two of said memory means contain differing digital representations of the same waveform.

3. A digital data synthesizer as in claim 2 and wherein said at least two memory means contain digital representations that differ in the number of addresses utilized to store said waveform.

4. A digital data synthesizer as in claim 1 and further comprising:
digital-to-analog converter means for converting said digital data to analog output signals; and
filter means receiving said analog output signals, for reducing undesired components of said analog output signals and outputting the selected synthesized frequency.

5. A digital data synthesizer as in claim 4 and wherein:
said digital data comprises a plurality of portions of digital data of different weight significance; and
said digital-to-analog converter means comprises a plurality of digital-to-analog converters on a single chip, each for converting a portion of said digital data of different weight significance.

6. A digital data synthesizer as in claim 1 and:
further comprising at least one further main memory means utilizing a plurality of addresses to store a different representation of a same main waveform, for outputting slightly different main waveform data representing said same main waveform when accessed by said addresses from said accumulator means, for synthesizing different frequencies;
wherein said decoder/addresser means responsive to the frequency selected to be synthesized further comprises means for selectively activating only one of the main memory means, the activated one being a particular main memory means that is predetermined for use in synthesizing the particular frequency that is to be synthesized;
wherein said means for combining said main waveform data and correction data comprises means for combining data from the particular main memory means and the particular correction memory means that are activated in response to particular frequencies by said decoder/addresser means, to produce a composite output signal.

7. A digital data synthesizer comprising:
means for storing input data that determines a frequency to be synthesized;
clock means for transferring said input data periodically from said storing means to accumulator means;
accumulator means for accumulating the received input data and outputting addresses;
main memory means utilizing a plurality of addresses to store a representation of a main waveform, for outputting main waveform data when accessed by said addresses from said accumulator means;
first correction memory means utilizing a plurality of addresses to store a first predetermined correction table, for outputting first correction data when accessed by said addresses from said accumulator means;
at least one other correction memory means utilizing a plurality of addresses to store a different predetermined correction table, for outputting different correction data when accessed by said addresses from said accumulator means;
decoder/addresser means responsive to the frequency selected to be synthesized, for selectively activating, one at a time, a single particular correction memory means that is predetermined for use in synthesizing the particular frequency that has been selected to be synthesized;
means for combining said main waveform data and correction data from the particular correction memory means that is activated by said decoder/addresser means, to produce a composite output signal;
whereby different selected frequencies of the same waveform are corrected by data from different correction memory means.

8. A digital data synthesizer as in claim 7 and:
wherein said means for combining comprises digital means for combining said first and second data; and
further comprising digital-to-analog converter means (DAC) receiving said composite output signal and converting said composite output signal to an analog composite output signal.

9. A digital data synthesizer as in claim 7 and further comprising:
first digital-to-analog converter means (DAC1) receiving said first data, for converting it to first analog signals;
second digital-to-analog converter means (DAC2) receiving said second data, for converting said second data to second analog signals; and wherein said means for combining comprises analog means for combining said first and second analog signals.

10. A digital data synthesizer as in claim 9 and wherein each of said DAC1 and said DAC2 comprises a plurality of digital-to-analog converters on a single chip, each converter of which is for converting a portion of said output digital data of different weight significance from the others.

11. A digital data synthesizer as in claim 7 and further comprising filter means receiving said analog signals, for reducing undesired components thereof and outputting the synthesized frequency.

* * * * *